(12) United States Patent
Wilson et al.

(10) Patent No.: US 9,147,417 B1
(45) Date of Patent: Sep. 29, 2015

(54) SYSTEMS AND METHODS FOR HEAD POSITION ESTIMATION

(71) Applicant: LSI Corporation, San Jose, CA (US)

(72) Inventors: Bruce A. Wilson, San Jose, CA (US); Travis R. Oenning, Rochester, MN (US); Richard Rauschmayer, Longmont, CO (US); Jeffrey Grundvig, Loveland, CO (US)

(73) Assignee: Avago Technologies General IP (Singapore) PTE. LTD., Singapore (SG)

( * ) Notice: Subject to any disclaimer, the term of this patent is extended or adjusted under 35 U.S.C. 154(b) by 5 days.

(21) Appl. No.: 14/230,240

(22) Filed: Mar. 31, 2014

Related U.S. Application Data

(60) Provisional application No. 61/954,556, filed on Mar. 17, 2014.

(51) Int. Cl.
    *G11B 5/455* (2006.01)
    *G11B 5/48* (2006.01)
    *G11B 5/09* (2006.01)
    *G11B 20/12* (2006.01)

(52) U.S. Cl.
    CPC .............. *G11B 5/4886* (2013.01); *G11B 5/09* (2013.01); *G11B 20/1217* (2013.01); *G11B 2020/1232* (2013.01); *G11B 2220/2516* (2013.01)

(58) Field of Classification Search
    CPC ........... G11B 5/4886; G11B 20/10046; G11B 19/045; G11B 5/012; G11B 20/1217; G11B 2020/1298; G11B 2020/10759; G11B 201/10398; G11B 5/09; G11B 2020/1232; G11B 2220/2516; G06F 9/46; H04L 1/0047
    USPC ................... 369/53.39, 47.28; 360/51, 45, 69
    See application file for complete search history.

(56) References Cited

U.S. PATENT DOCUMENTS

| 8,379,498 B2 * | 2/2013 | Mathew et al. ............ 369/47.28 |
| 2015/0067685 A1 * | 3/2015 | Yang ............................. 718/100 |

OTHER PUBLICATIONS

U.S. Appl. No. 14/025,409, filed Sep. 12, 2013, Shaohua Yang, Unpublished.
U.S. Appl. No. 14/483,306, filed Jan. 6, 2014, Lu Pan, Unpublished.
U.S. Appl. No. 14/217,833, filed Mar. 18, 2014, Jeffrey P. Grundvig, Unpublished.
U.S. Appl. No. 14/217,805, filed Mar. 18, 2014, Jeffrey P. Grundvig, Unpublished.
U.S. Appl. No. 14/217,783, filed Mar. 18, 2014, Jeffrey P. Grundvig, Unpublished.
U.S. Appl. No. 14/230,120, filed Mar. 31, 2014, Eui Seok Hwang.

* cited by examiner

*Primary Examiner* — Ali Neyzari
(74) *Attorney, Agent, or Firm* — Hamilton DeSanctis & Cha

(57) ABSTRACT

Systems, methods, devices, circuits for data processing, and more particularly to systems and methods for determining a down track distance between two or more read heads on a read/write head assembly.

20 Claims, 10 Drawing Sheets

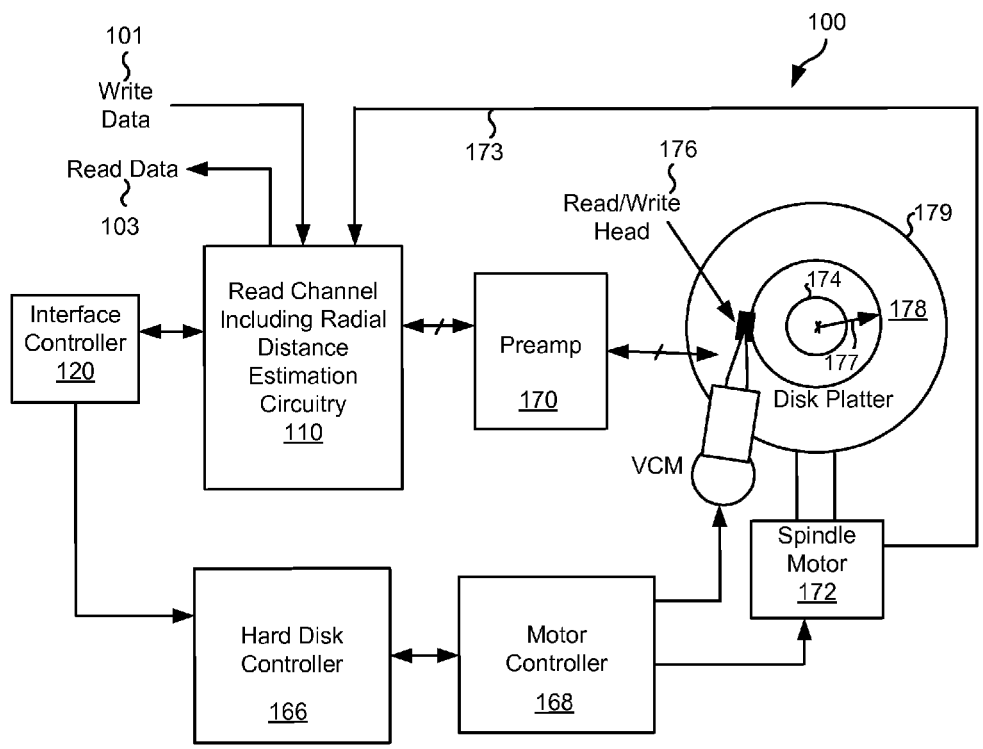
Fig. 1a
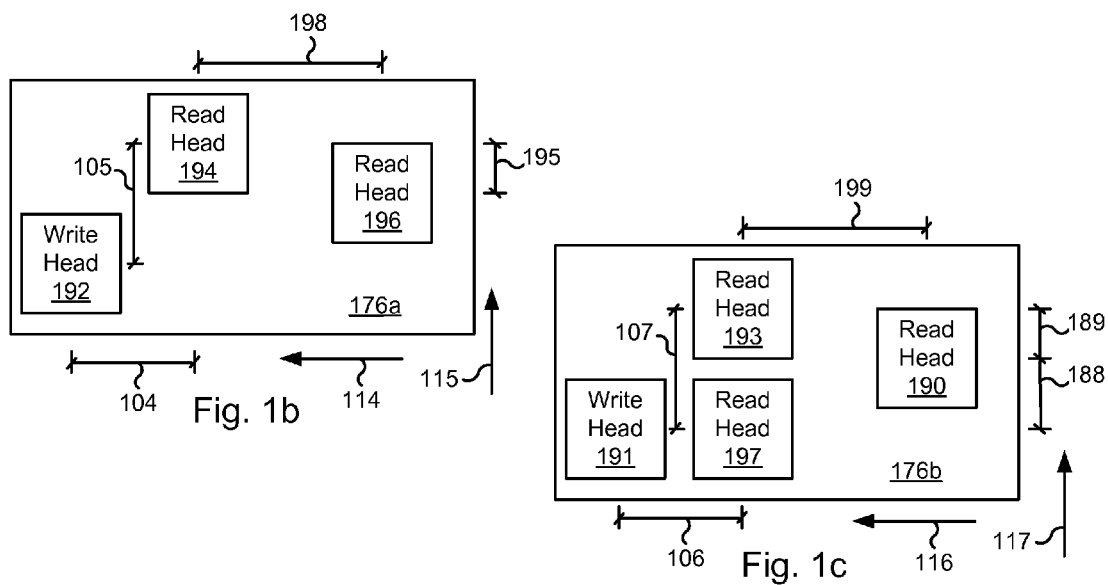
Fig. 1b
Fig. 1c

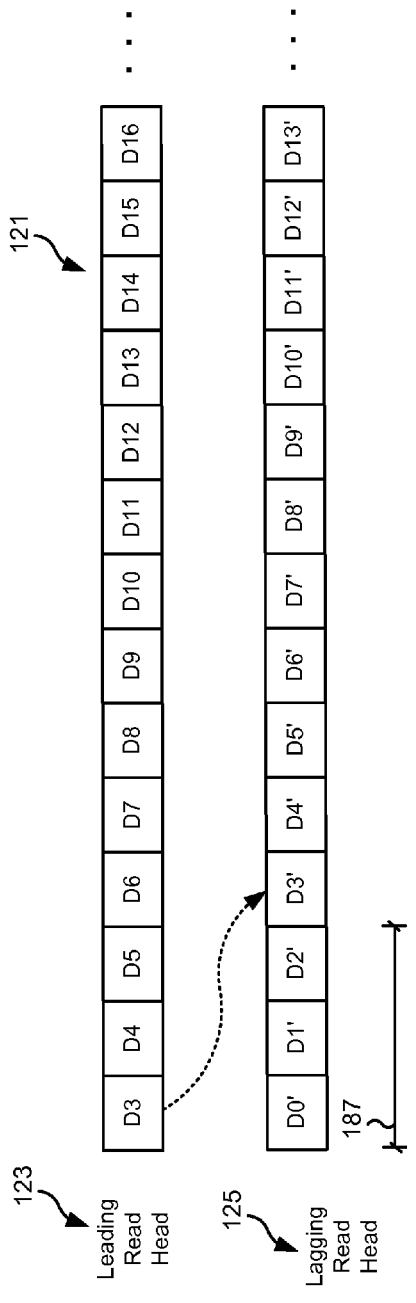
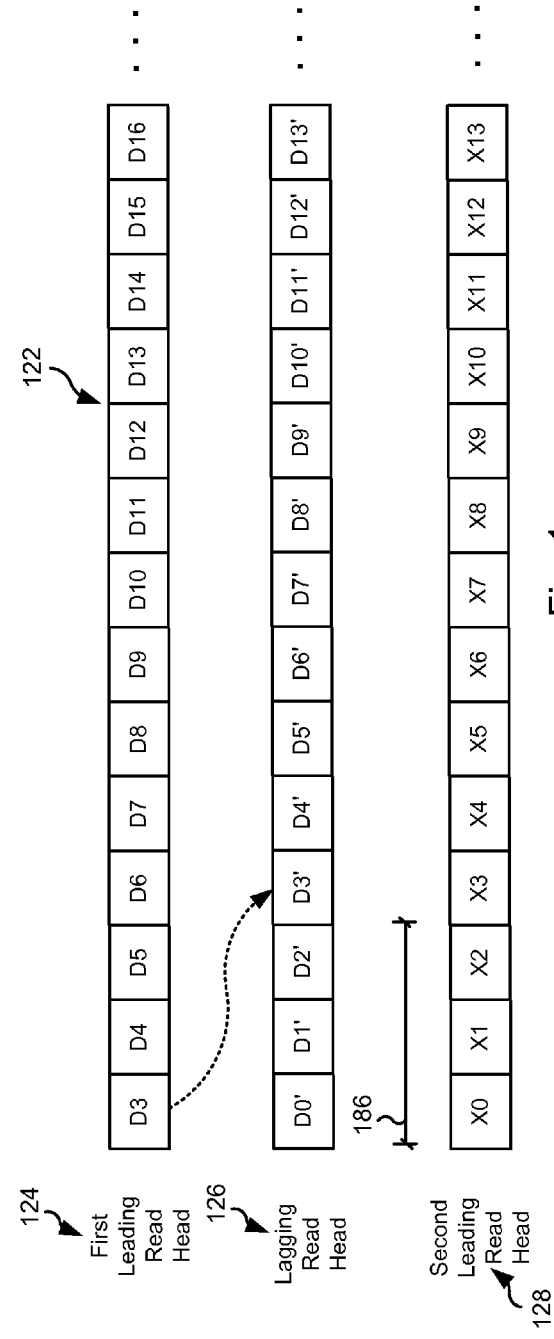
Fig. 1d
Fig. 1e

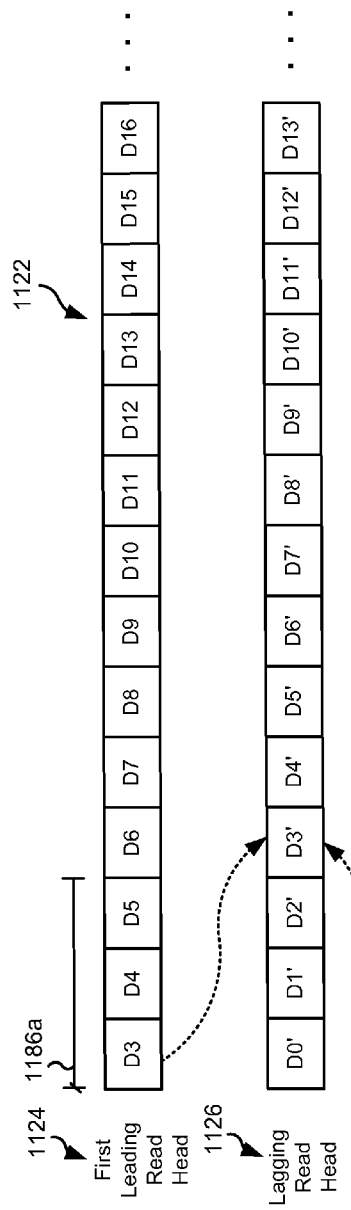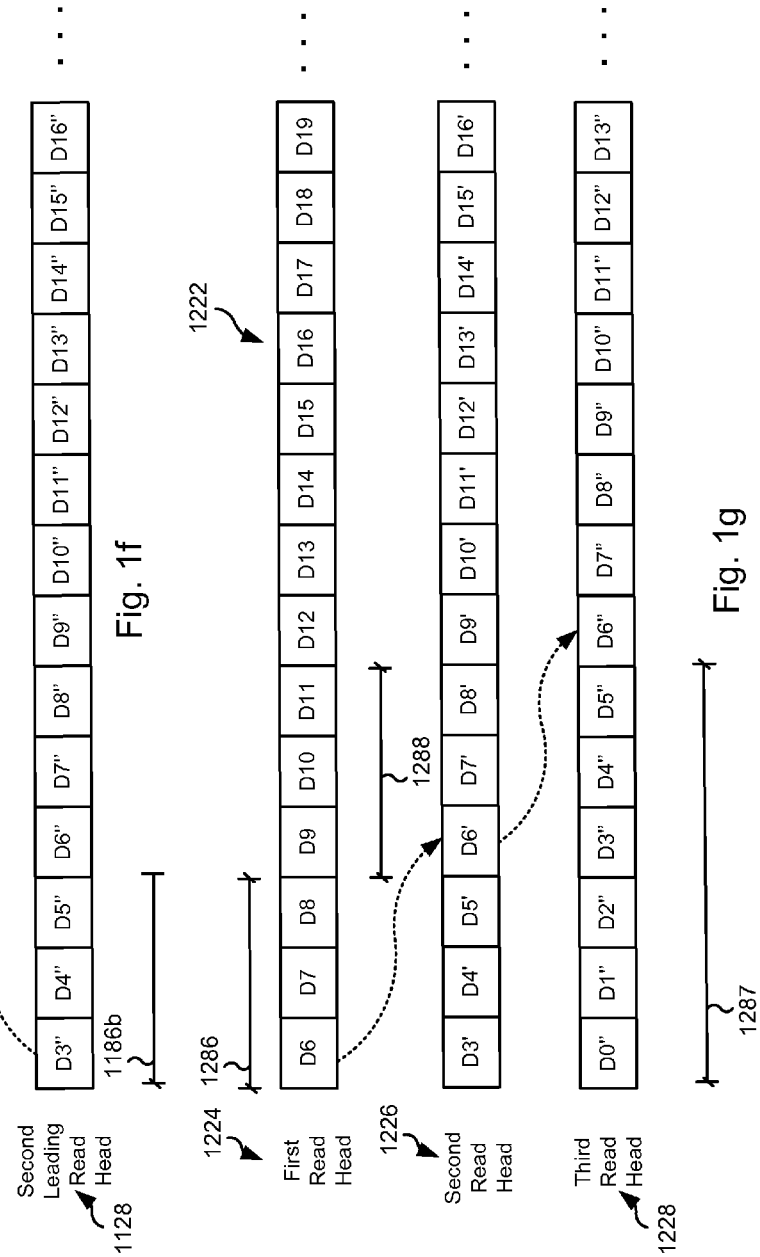
Fig. 1f
Fig. 1g

SYSTEMS AND METHODS FOR HEAD POSITION ESTIMATION

CROSS REFERENCE TO RELATED APPLICATIONS

The present application claims priority to (is a non-provisional of) U.S. Pat. App. No. 61/954,556 entitled "Systems and Methods for Head Position Estimation", and filed Mar. 17, 2014 by Wilson et al. The entirety of the aforementioned provisional patent application is incorporated herein by reference for all purposes.

FIELD OF THE INVENTION

Systems, methods, devices, circuits for determining a location of a read/write head relative to a storage medium.

BACKGROUND

As the density of information stored on a storage medium increases, the use of multiple read heads has been developed to sense and process data from a user data region of a storage medium. In the case of two read heads, the two heads may be located, for example, approximately 100 nm apart in a down track direction. In some cases, a data unlock occurs causing the location of a read/write head relative to a storage medium to become unknown. During such a condition it is possible that the read/write head may strike a crash stop or loading ramp of a storage device resulting in damage.

Hence, for at least the aforementioned reasons, there exists a need in the art for advanced systems and methods for determining a location of a read/write head assembly relative to the storage medium.

SUMMARY

Systems, methods, devices, circuits for determining a location of a read/write head relative to a storage medium.

Various embodiments of the present invention provide data processing systems that include: a first data input processing circuit operable to receive a first data set from a first read head and to store the first data set to a first buffer, and a second data input processing circuit operable to receive a second data set from a second read head and to store the second data set to a second buffer. The second data set is offset from the first data set. The systems further include a correlation processing circuit operable to: correlate a portion of the first data set with a portion of the second data set to yield a correlation value; and determine the offset between the first data set and the second data set at a delay where the correlation value indicates a match between the portion of the first data set and the portion of the second data set. In addition, the systems include a radius calculation circuit operable to calculate an estimated radial location of a track on a storage medium from which the first data set and the second data set are derived.

This summary provides only a general outline of some embodiments of the invention. The phrases "in one embodiment," "according to one embodiment," in various embodiments", in one or more embodiments", "in particular embodiments" and the like generally mean the particular feature, structure, or characteristic following the phrase is included in at least one embodiment of the present invention, and may be included in more than one embodiment of the present invention. Importantly, such phases do not necessarily refer to the same embodiment. Many other embodiments of the invention will become more fully apparent from the following detailed description, the appended claims and the accompanying drawings.

BRIEF DESCRIPTION OF THE FIGURES

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

FIG. 1a shows a storage system including radial location estimating circuitry in accordance with some embodiments of the present invention;

FIG. 1b shows an example distribution of two read heads and a write head disposed as part of a read/write head assembly that may be used in relation to various embodiments of the present invention;

FIG. 1c shows an example distribution of three read heads and a write head disposed as part of a read/write head assembly that may be used in relation to various embodiments of the present invention;

FIG. 1d depicts an example delay of data sensed from the same track of a storage medium by two different read heads;

FIG. 1e depicts an example delay of data sensed from the same track of a storage medium by two of three different read heads with the third read head traversing a different track of the storage medium;

FIG. 1f depicts an example delay of data sensed from the same track of a storage medium by three of three different read heads all traversing the same track of the storage medium;

FIG. 1g depicts another example delay of data sensed from the same track of a storage medium by three of three different read heads all traversing the same track of the storage medium with a first read head preceding a second read head, and the second read head preceding a third read head;

DETAILED DESCRIPTION OF SOME EMBODIMENTS

Figure 2A:
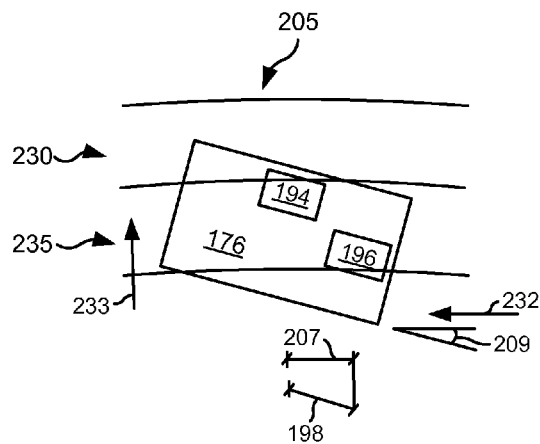
FIGS. 2a-2d show example orientations of a read/write head assembly relative to tracks on a storage medium for different radial positions on the storage medium that may occur in relation to various embodiments of the present invention.

Systems, methods, devices, circuits for determining a location of a read/write head relative to a storage medium.

Various embodiments of the present invention provide data processing systems that include: a first data input processing circuit operable to receive a first data set from a first read head and to store the first data set to a first buffer, and a second data input processing circuit operable to receive a second data set from a second read head and to store the second data set to a second buffer. The second data set is offset from the first data set. The systems further include a correlation processing circuit operable to: correlate a portion of the first data set with a portion of the second data set to yield a correlation value; and determine the offset between the first data set and the second data set at a delay where the correlation value indicates a match between the portion of the first data set and the portion of the second data set. In addition, the systems include a radius calculation circuit operable to calculate an estimated radial location of a track on a storage medium from which the first data set and the second data set are derived. In some instances of the aforementioned embodiments, the system is implemented as part of an integrated circuit. In one or more instances of the aforementioned embodiments, the first data input processing circuit includes at least one of: an analog filter circuit, an analog amplifier circuit, an analog to digital converter circuit, and an equalizer circuit.

In some instances of the aforementioned embodiments where the portion of the second data set is a first portion of the second data set, the correlation processing circuit is further operable to: select the first portion of the second data set based upon a first index; determine that the first portion of the second data set does not match the portion of the first data set; select a second portion of the second data set based upon a second index; and determine that the second portion of the second data set matches the portion of the first data set. The offset is generated based at least in part on the second index.

In one or more instances of the aforementioned embodiments, the data processing system is implemented as part of a data storage device, and the data storage device includes the storage medium. In some such instances, calculating the estimated radial location of the track on the storage medium is further based upon a rotational rate of the storage medium. In particular cases, the radial location of the track on the storage medium is calculated in accordance with the following equation:

$$\frac{(\text{Expected Distance}) * (\text{Period of Revolution of the Storage Medium})}{2\pi\tau},$$

where the expected distance is a distance between the first read head and the second read head, the period of revolution of the storage medium is calculated based upon the rotational rate of the storage medium, and τ is the offset in units of time.

In various instances of the aforementioned embodiments where the offset is a first offset and the correlation value is a first correlation value, the systems may further include a third data input processing circuit operable to receive a third data set from a third read head and to store the third data set to a third buffer. In such instances, the correlation processing circuit may be further operable to: correlate a portion of the first data set with a portion of the third data set to yield a second correlation value; and determine a second offset between the first data set and the third data set at a delay where the second correlation value indicates a match between the portion of the first data set and the portion of the third data set. The radius calculation circuit is further operable to calculate the estimated radial location of the track on the storage medium from which at least two of the first data set, the second data set and the third data set are derived based at least in part on one of the first offset or the second offset. In some such instances, the data processing system is implemented as part of a data storage device, and the data storage device includes the storage medium. In some cases, the first correlation value does not indicate a match between the portion of the first data set and the portion of the second data set, and the second correlation value does indicate a match between the portion of the first data set and the portion of the third data set. In such cases, calculating the estimated radial location of the track on the storage based on the second offset and a rotational rate of the storage medium.

Turning to FIG. 1a, a storage system 100 including a read channel circuit 110 having radial location estimating circuitry in accordance with some embodiments of the present invention. Storage system 100 may be, for example, a hard disk drive. Storage system 100 also includes a preamplifier 170, an interface controller 120, a hard disk controller 166, a motor controller 168, a spindle motor 172, a disk platter 178, and a read/write head 176. Interface controller 120 controls addressing and timing of data to/from disk platter 178. The data on disk platter 178 consists of groups of magnetic signals that may be detected by read/write head assembly 176 when the assembly is properly positioned over disk platter 178. In one embodiment, disk platter 178 includes magnetic signals recorded in accordance with either a longitudinal or a perpendicular recording scheme. The data on disk platter 178 is stored as tracks that are located between an inner diameter 174 and an outer diameter 179 with the track of interest as a radial distance 177 from a center point.

In a typical read operation, read/write head assembly 176 is accurately positioned by motor controller 168 over multiple data tracks on disk platter 178. Read/write head assembly 176 includes two or more read heads capable of sensing data from two or more tracks at the same time, or for sensing multiple instances of the same track. Examples of read/write assembly 176 are shown in FIGS. 1b-1c. Turning to FIG. 1b, an example of read/write head assembly 176a is shown that includes two read heads 194, 196 that are physically separated in a down track direction by a distance 198, and in a cross track direction by a distance 195. Read/write head assembly 176a moves over the surface of a storage medium (e.g., disk platter 178) in a down track direction 114 as it is sensing data from a given track. As read/write head assembly 176a is moved between tracks it is moved in a cross track direction 115. Each of read heads 194, 196 are capable of sensing information from disk platter 178. In addition, read/write head assembly 176a includes a write head 192 that is capable of writing data to disk platter 178. It should be noted that distances 195, 198 between read heads 194, 196 and distances 104, 105 between read heads 194, 196 and write head 192 are not drawn to proportion. As an example, distance 198 may be on the order of 100 nm, and distance 104 may be between 2-5 μm. Distance 195 may be less than the width of a track on disk platter 178, and distance 105 may be, for example, on the order of 100 track widths. Thus, FIG. 1b is intended to show the specific elements included in read/write head assembly, but the drawing is grossly out of proportion.

Turning to FIG. 1c, an example of read/write head assembly 176b is shown that includes three read heads 190, 193, 197 where read heads 193, 197 are physically separated in a down track direction by a distance 199, and in a cross track direction by distances 189, 188, respectively. Read/write head assembly 176b moves over the surface of a storage medium (e.g., disk platter 178) in a down track direction 116 as it is sensing data from a given track. As read/write head assembly 176a is moved between tracks it is moved in a cross track direction 117. Each of read heads 193, 197, 190 are capable of sensing information from disk platter 178. In addition, read/write head assembly 176b includes a write head 191 that is capable of writing data to disk platter 178. It should be noted that distances 188, 189, 199 between read heads 190, 193, 197 and distances 106, 107 between read heads 190, 193, 197 and write head 191 are not drawn to proportion. As an example, distance 199 may be on the order of 100 nm, and distance 106 may be between 2-5 µm. Distances 188, 189 may be less than the width of a track on disk platter 178, and distance 175 may be, for example, on the order of 100 track widths. Thus, FIG. 1c is intended to show the specific elements included in read/write head assembly, but the drawing is grossly out of proportion. The cross-track separation between read heads 190, 193, 197 (i.e., distances 188, 189) are referenced to read head 190. It should be noted that the cross track separation between read heads 190, 193, 197 may be defined between any pair of the readers.

Turning to FIG. 1d, a timing diagram 121 shows an example of a delay 187 between data sensed from the same track of a storage medium using two read heads (a leading read head 123 and a lagging read head 125) physically separated in a down track direction on read/write head assembly 176. As shown, data (D3, D4, D5 . . . ) from leading read head 123 (e.g., read head 194) is shown in a timing relationship to data (D3', D4', D5' . . . ) from lagging read head 125 (e.g., read head 196). As shown, delay 187 corresponds to the physical separation between leading read head 123 and lagging read head 125 in a down track direction multiplied by the linear velocity of disk platter 178 relative to read/write head assembly 176. As indicated by a dashed line, the data of the same numbers (e.g., D3 and D3', D4 and D4', etc.) correspond from data sampled from approximately the same location on disk platter 178. The difference between the corresponding samples is indicated by identifying the data derived from leading read head 123 with just a number (e.g., D3) and the corresponding data derived from lagging read head 125 with the same number and the prime symbol (e.g., D3'). Three sources result in the differences between the corresponding data elements (e.g., D3 and D3'): (1) a difference in a cross track direction where the data is sampled by one read head verses the other, (2) the physical distance between the two read heads is not necessarily an integer multiple of a sampling clock, and (3) differences in noise introduced by the two different read heads. While the corresponding data elements are not identical, they are sufficiently similar when sensed from the same track of disk platter 178 to yield meaningful correlation results.

Turning to FIG. 1e, a timing diagram 122 shows an example of a delay 186 between data sensed from the same track of a storage medium using three read heads (a first leading read head 124, a lagging read head 126, and a second leading read head 128) physically separated in a down track direction on read/write head assembly 176. First leading read head 1124 is disposed at substantially the same down track distance from lagging read head 1124 as second leading read head 1128 similar to that shown in FIG. 1c. As shown, data (D3, D4, D5 . . . ) from a first leading read head 124 (e.g., read head 193) is shown in a timing relationship to data (D3', D4', D5' . . . ) from lagging read head 126 (e.g., read head 190). As shown, delay 186 corresponds to the physical separation between first leading read head 124 and lagging read head 126 in a down track direction multiplied by the linear velocity of disk platter 178 relative to read/write head assembly 176. As indicated by a dashed line, the data of the same numbers (e.g., D3 and D3', D4 and D4', etc.) correspond from data sampled from approximately the same location on disk platter 178. The difference between the corresponding samples is indicated by identifying the data derived from first leading read head 124 with just a number (e.g., D3) and the corresponding data derived from lagging read head 126 with the same number and the prime symbol (e.g., D3'). Three sources result in the differences between the corresponding data elements (e.g., D3 and D3'): (1) a difference in a cross track direction where the data is sampled by one read head verses the other, (2) the physical distance between the two read heads is not necessarily an integer multiple of a sampling clock, and (3) differences in noise introduced by the two different read heads. While the corresponding data elements are not identical, they are sufficiently similar when sensed from the same track of disk platter 178 to yield meaningful correlation results. In contrast to the first leading read head 124 and lagging read head 126, second leading read head 128 is disposed over different track and as such yields a data set that does not correspond to the data sets generated by first leading read head 124 and lagging read head 126. This non-corresponding data is labeled with an X instead of a D (i.e., X0, X1, X2 . . . ).

Turning to FIG. 1f, a timing diagram 1122 shows an example of a delay 1186a and a delay 1186b between data sensed from the same track of a storage medium using three read heads (a first leading read head 1124, a lagging read head 1126, and a second leading read head 1128) physically separated in a down track direction on read/write head assembly 176. First leading read head 1124 is disposed at substantially the same down track distance from lagging read head 1124 as second leading read head 1128 similar to that shown in FIG. 1c. As such, any difference between delay 1186a and delay 1186b is due to the stroke (i.e., a different skew angle) of read/write head assembly relative to a target track. As shown, data (D3, D4, D5 . . . ) from a first leading read head 1124 (e.g., read head 193) is shown in a timing relationship to data (D3', D4', D5' . . . ) from lagging read head 1126 (e.g., read head 190). As shown, delay 1186a corresponds to the physical separation between first leading read head 1124 and lagging read head 1126 in a down track direction multiplied by the linear velocity of disk platter 178 relative to read/write head assembly 176; and delay 1186b corresponds to the physical separation between second leading read head 1128 and lagging read head 1126 in a down track direction multiplied by the linear velocity of disk platter 178 relative to read/write head assembly 176. As indicated by the dashed lines, the data of the same numbers (e.g., D3, D3' and D3"; and D4, D4' and D4", etc.) correspond from data sampled from approximately the same location on disk platter 178. The difference between the corresponding samples is indicated by identifying the data derived from first leading read head 1124 with just a number (e.g., D3), the corresponding data derived from lagging read head 1126 with the same number and the prime symbol (e.g., D3'), and the corresponding data derived from second leading read head 1128 with the same number and two prime symbols (e.g., D3"). Three sources result in the differences between the corresponding data elements (e.g., D3, D3' and D3"): (1) a difference in a cross track direction where the data is sampled by one read head verses the other, (2) the physical distance between the two read heads is not necessarily an integer multiple of a sampling clock, and (3) differences in noise introduced by the two different read heads. While the corresponding data elements are not identical, they are sufficiently similar when sensed from the same track of disk platter 178 to yield meaningful correlation results.

Turning to FIG. 1g, a timing diagram 1222 shows an example of a delay 1286, a delay 1287 and a delay 1288 between data sensed from the same track of a storage medium using three read heads (a first read head 1224, a second read head 1226, and a third read head 1228) physically separated in a down track direction on read/write head assembly 176. In particular, delay 1286 is a time difference between first read head 1224 and second read head 1226, delay 1287 is a time difference between first read head 1224 and third read head 1228, and delay 1288 is a time difference between second read head 1226 and third read head 1228. Unlike the example discussed above in relation to FIGS. 1c and 1f, first read head 1224 precedes (i.e., is located down track from) second read head 1226, and second read head 1226 precedes third read head 1228. As such, differences difference between delay 1286, delay 1287 and delay 1288 is primarily due to the physical separation of the read heads in the down track direction. As shown, data (D6, D7, D8 . . . ) from first read head 1224 is shown in a timing relationship to data (D6', D7', D8' . . . ) from second read head 1226, and a timing relationship to data (D6", D7", D8" . . . ) from third read head 1228. As indicated by the dashed lines, the data of the same numbers (e.g., D6, D6' and D6"; and D7, D7' and D7", etc.) correspond from data sampled from approximately the same location on disk platter 178. The difference between the corresponding samples is indicated by identifying the data derived from first read head 1224 with just a number (e.g., D6), the corresponding data derived from second read head 1226 with the same number and the prime symbol (e.g., D6'), and the corresponding data derived from third read head 1228 with the same number and two prime symbols (e.g., D6"). Three sources result in the differences between the corresponding data elements (e.g., D6, D6' and D6"): (1) a difference in a cross track direction where the data is sampled by one read head verses the other, (2) the physical distance between the two read heads is not necessarily an integer multiple of a sampling clock, and (3) differences in noise introduced by the two different read heads. While the corresponding data elements are not identical, they are sufficiently similar when sensed from the same track of disk platter 178 to yield meaningful correlation results.

Referring again to FIG. 1a, motor controller 168 both positions read/write head assembly 176 in relation to disk platter 178 and drives spindle motor 172 by moving read/write head assembly 176 to the proper data track on disk platter 178 under the direction of hard disk controller 166. Spindle motor 172 spins disk platter 178 at a determined angular velocity (RPMs) that remains substantially constant. The linear velocity (m/s) at which disk platter 178 moves varies based upon radial distance 177 of read/write head 176 from the center point of disk platter 178 for the track of interest. This angular velocity information 173 is provided to the radial location estimating circuitry of read channel circuit 110.

Once read/write head assembly 176 is positioned adjacent to a desired track of disk platter 178 (e.g., track 235 of FIG. 2a), magnetic signals representing data on the track are sensed by read/write head assembly 176 as disk platter 178 is rotated by spindle motor 172. The stream of sensed magnetic signals are provided as a continuous analog signal representative of the magnetic data on the track of disk platter 178. This stream of analog signals is transferred from read/write head assembly 176 to read channel circuit 110 via preamplifier 170. Preamplifier 170 is operable to amplify the analog signals accessed from disk platter 178. In turn, read channel circuit 110 decodes and digitizes the received analog signals to recreate the information originally written to disk platter 178. This data is provided as read data 103 to a receiving circuit. A write operation is substantially the opposite of the preceding read operation with write data 101 being provided to read channel circuit 110. This data is then encoded and written to disk platter 178.

During a read of data from disk platter 178, data is received from read head 194 and read head 196. The data from each of read head 194 and read head 196 are used to process the received data. Where an unlocked condition occurs (i.e., read channel circuit 110 loses track of servo data regions accessed from disk platter 178), the radial distance estimation circuit 110 calculates an estimate of the radial distance of read/write head 176 from the center point of disk platter 178 is calculated. This information is provided to interface controller 120 where it is used to avoid moving read/write head assembly 176 toward a position where it may either strike a crash stop or a loading ramp associated with disk platter 178. The radial distance estimation processing of read channel circuit 110 may be done using a system similar to one of those discussed below in relation to FIGS. 2-4, and/or may use a method similar to one of those discussed below in relation to FIGS. 5-7.

It should be noted that storage system 100 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such as storage system 100, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

A data decoder circuit used in relation to read channel circuit 110 may be, but is not limited to, a low density parity check (LDPC) decoder circuit as are known in the art. Such low density parity check technology is applicable to transmission of information over virtually any channel or storage of information on virtually any media. Transmission applications include, but are not limited to, optical fiber, radio frequency channels, wired or wireless local area networks, digital subscriber line technologies, wireless cellular, Ethernet over any medium such as copper or optical fiber, cable channels such as cable television, and Earth-satellite communications. Storage applications include, but are not limited to, hard disk drives, compact disks, digital video disks, magnetic tapes and memory devices such as DRAM, NAND flash, NOR flash, other non-volatile memories and solid state drives.

In addition, it should be noted that storage system 100 may be modified to include solid state memory that is used to store data in addition to the storage offered by disk platter 178. This solid state memory may be used in parallel to disk platter 178 to provide additional storage. In such a case, the solid state memory receives and provides information directly to read channel circuit 110. Alternatively, the solid state memory may be used as a cache where it offers faster access time than that offered by disk platted 178. In such a case, the solid state memory may be disposed between interface controller 120 and read channel circuit 110 where it operates as a pass through to disk platter 178 when requested data is not available in the solid state memory or when the solid state memory does not have sufficient storage to hold a newly written data set. Based upon the disclosure provided herein, one of ordinary skill in the art will recognize a variety of storage systems including both disk platter 178 and a solid state memory.

Turning to FIG. 2a-2d, example orientations 205, 215, 225, 275 of a read/write head assembly 176 relative to tracks on a storage medium (e.g., disk platter 178) for different radial positions on the storage medium that may occur in relation to various embodiments of the present invention. Turning to FIG. 2a, example orientation 205 shows read/write head 176 traversing tracks 230, 235 near an outer diameter of disk platter 178 and in a down track direction 232. Of note, write head 192 is not included due to the disproportion of the distances between read heads 194, 196 and write head 192. Track 235 is located a radial distance 233 from the center point of disk platter 178. The speed at which disk platter 178 is rotating varies depending upon the magnitude of radial distance 233. In the orientation shown, a down track distance 207 between read heads 194, 196 is a function of distance 198 and a skew angle 209. In particular, down track distance 207 is related to distance 198 by the following equation:

Distance 207=(Distance 198)cos(skew angle 209).

Distance 198 is the inline distance between read heads 194, 196. The aforementioned equation assumes cross-track separation is zero and skew is zero which provides a reasonable estimate of the distance. Where accuracy is to be enhanced, the following equation may be used to address the differences in cross track direction:

Distance 207=Sqrt[(Distance 198)$^2$+(Cross-Track Distance 195)$^2$] cos(skew angle 209+skew angle between other read head).

where skew angle 209 is the angle from level of one of the read heads and the added skew angle is the angle from level of the other read head.

Figure 2B:
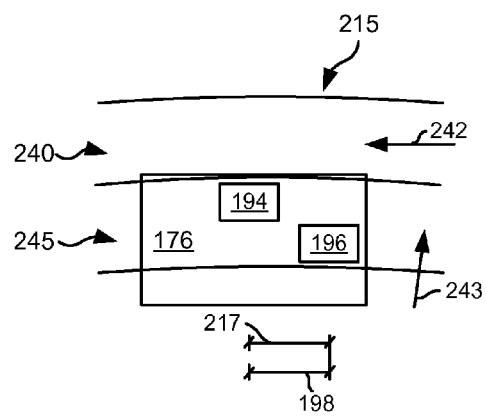

Turning to FIG. 2b, example orientation 215 shows read/write head 176 traversing tracks 240, 245 somewhere near a mid point between an outer diameter and an inner diameter of disk platter 178 in a down track direction 242. Track 245 is located a radial distance 243 from the center point of disk platter 178. The speed at which disk platter 178 is rotating varies depending upon the magnitude of radial distance 243. In the orientation shown, a down track distance 217 between read heads 194, 196 is the same as distance 198 as the skew angle is zero. Distance 198 is the inline distance between read heads 194, 196.

Figure 2C:
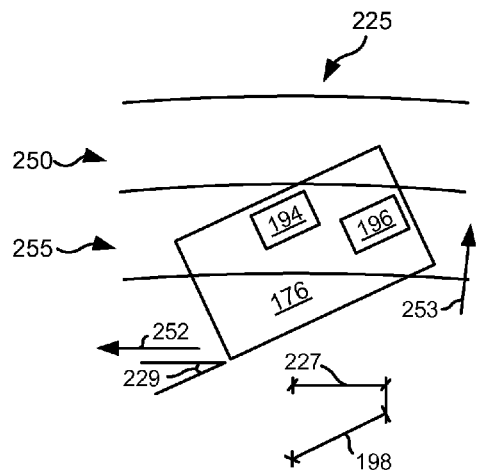

Turning to FIG. 2c, example orientation 225 shows read/write head 176 traversing tracks 250, 255 near an inner diameter of disk platter 178 and in a down track direction 252. Track 255 is located a radial distance 253 from the center point of disk platter 178. The speed at which disk platter 178 is rotating varies depending upon the magnitude of radial distance 253. In the orientation shown, a down track distance 227 between read heads 194, 196 is a function of distance 198 and a skew angle 229. In particular, down track distance 227 is related to distance 198 by the following equation:

Distance 227=(Distance 198)cos(skew angle 229).

Distance 198 is the inline distance between read heads 194, 196. The aforementioned equation assumes cross-track separation is zero and skew is zero which provides a reasonable estimate of the distance. Where accuracy is to be enhanced, the following equation may be used to address the differences in cross track direction:

Distance 227=Sqrt[(Distance 198)$^2$+(Cross-Track Distance 195)$^2$] cos(skew angle 229+skew angle between other read head).

where skew angle 229 is the angle from level of one of the read heads and the added skew angle is the angle from level of the other read head.

Figure 2D:
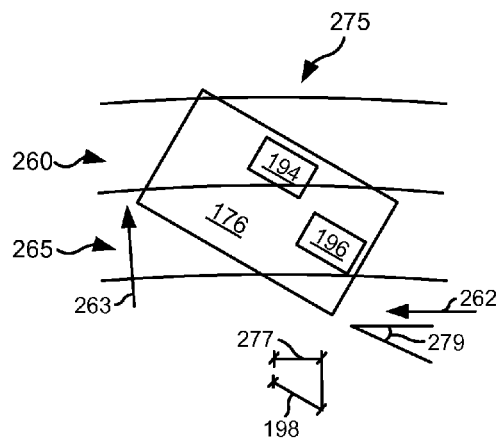

Turning to FIG. 2d, example orientation 275 shows read/write head 176 traversing tracks 260, 265 near an outer diameter of disk platter 178 and in a down track direction 262. Track 265 is located a radial distance 263 from the center point of disk platter 178. In particular, read head 194 is substantially over track 265 and read head 196 is substantially over track 260. The speed at which disk platter 178 is rotating varies depending upon the magnitude of radial distance 263. In the orientation shown, a down track distance 277 between read heads 194, 196 is a function of distance 198 and a skew angle 279. In particular, down track distance 277 is related to distance 198 by the following equation:

Distance 277=(Distance 198)cos(skew angle 279).

Distance 198 is the inline distance between read heads 194, 196. The aforementioned equation assumes cross-track separation is zero and skew is zero which provides a reasonable estimate of the distance. Where accuracy is to be enhanced, the following equation may be used to address the differences in cross track direction:

Distance 277=Sqrt[(Distance 198)$^2$+(Cross-Track Distance 195)$^2$] cos(skew angle 279+skew angle between other read head).

where skew angle 279 is the angle from level of one of the read heads and the added skew angle is the angle from level of the other read head.

Figure 3:
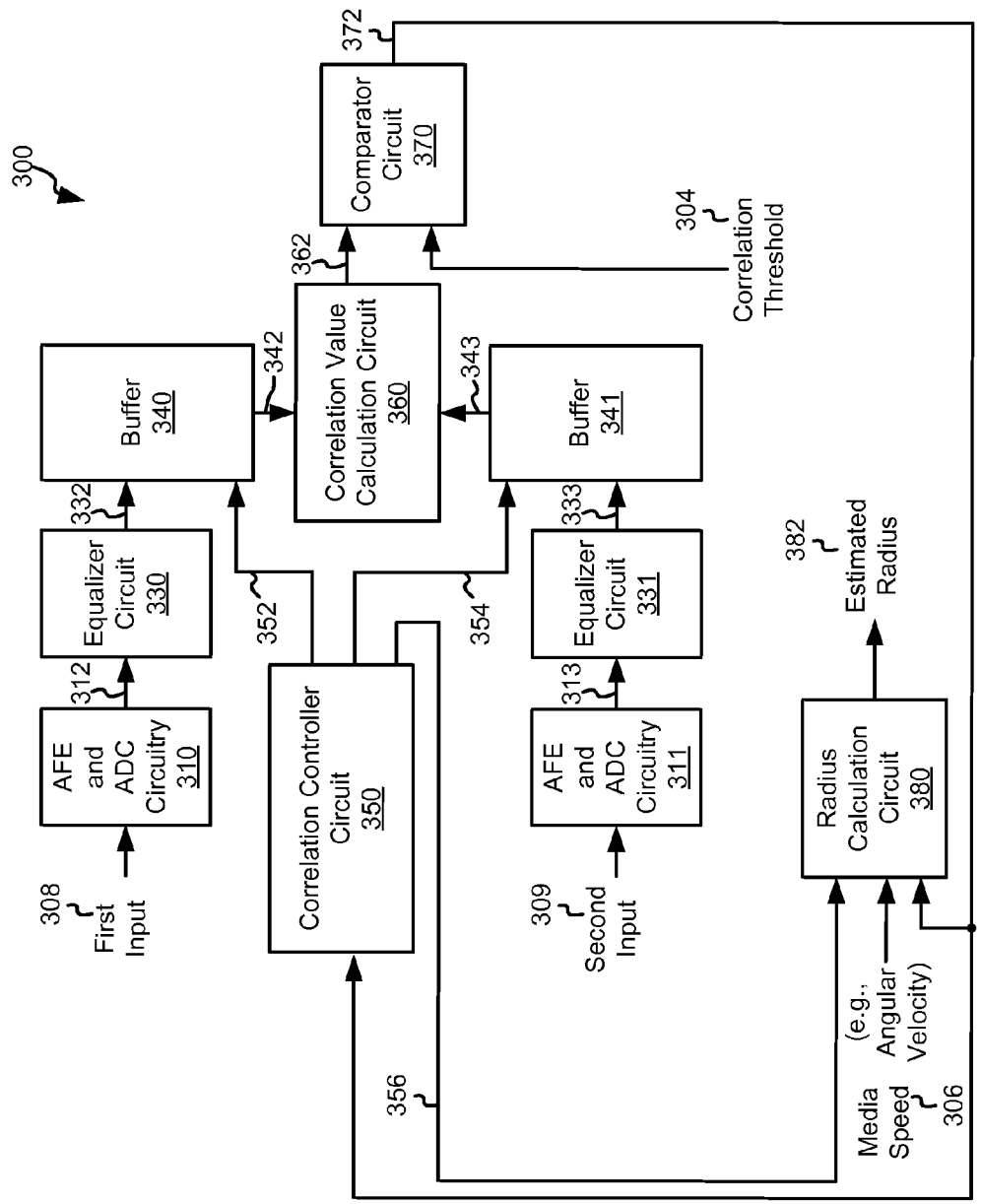
FIG. 3 is a block diagram of a radial distance estimation system in accordance with some embodiments of the present invention.

Turning to FIG. 3, a block diagram of a radial distance estimation system 300 is shown in accordance with some embodiments of the present invention. Radial distance estimation system 300 includes analog front end and analog to digital conversion circuitry 310 that receives a first input 308 (i.e., an input from a first read head) and provides corresponding digital samples 312. The analog front end circuitry processes first input 308 to yield a processed analog signal. The analog front end circuitry may include, but is not limited to, an analog filter and an amplifier circuit as are known in the art. Based upon the disclosure provided herein, one of ordinary skill in the art will recognize a variety of circuitry that may be included as part of the analog front end circuit.

The resulting processed analog signal is converted to digital samples 312 by the analog to digital converter circuitry. The analog to digital converter circuitry may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 312 are provided to an equalizer circuit 330 that applies an equalization algorithm to filtered output 322 to yield an equalized output 332. In some embodiments of the present invention, equalizer circuit 330 is a digital finite impulse response circuit as is known in the art. Equalized output 332 is stored to a buffer 340 where it is stored.

Similarly, radial distance estimation system 300 includes analog front end and analog to digital conversion circuitry 311 that receives a second input 309 (i.e., an input from a first read head) and provides corresponding digital samples 313. The analog front end circuitry processes second input 309 to yield a processed analog signal. The analog front end circuitry may include, but is not limited to, an analog filter and an amplifier circuit as are known in the art. Based upon the disclosure provided herein, one of ordinary skill in the art will recognize a variety of circuitry that may be included as part of the analog front end circuit.

The resulting processed analog signal is converted to digital samples 313 by the analog to digital converter circuitry. The analog to digital converter circuitry may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 313 are provided to an equalizer circuit 331 that applies an equalization algorithm to filtered output 323 to yield an equalized output 333. In some embodiments of the present invention, equalizer circuit 331 is a digital finite impulse response circuit as is known in the art. Equalized output 333 is stored to a buffer 341 where it is stored.

A correlation controller circuit 350 controls selection of a buffered portion 342 (i.e., a segment of data in buffer 340) and a buffered portion 343 (i.e., a segment of data in buffer 341) that are to be correlated. In particular, correlation controller circuit 350 asserts an offset 352 that is used to select buffered portion 342 from equalized output 332 stored to buffer 340, and correlation controller circuit 350 asserts an offset 354 that is used to select buffered portion 343 from equalized output 333 stored to buffer 341. Correlation controller circuit 350 provides a data offset value 356 to a radius calculation circuit 380. Data offset value 356 is a difference between offset 352 and offset 354. As an example, data offset value 356 corresponds to distance 187a of FIG. 1d when the portions derived from buffer 340 and buffer 341 are aligned.

Buffered portion 342 and buffered portion 343 are provided to a correlation value calculation circuit 360 that is operable to calculate a correlation value 362 indicative of the similarity between buffered portion 342 and buffered portion 343. In one particular embodiment of the present invention, correlation value calculation circuit 360 calculates correlation value 362 in accordance with the following equation:

Correlation Value 362 =

$$\sum_{i=0}^{n} (\text{Buffered Portion } 342[i] - \text{Buffered Portion } 343[i])^2,$$

where n+1 is the number of elements included in the correlation calculation. In one particular embodiment of the present invention, n has a value of eight. Based upon the disclosure provided herein, one of ordinary skill in the art will recognize a variety of correlation algorithms that may be used in relation to different embodiments of the present invention, and/or different values for n that may be used in relation to different embodiments of the present invention.

Correlation value 362 is provided to a comparator circuit 370 that compares it to a correlation threshold 304 to yield a comparison result 372. In some cases, correlation threshold 304 is user programmable. Comparison result 372 is provided to radius calculation circuit 380 and to correlation controller circuit 350. Where comparison result 372 indicates that correlation value 362 is less than correlation threshold 304, radius calculation circuit 380 calculates an estimated radial distance from an inner point of a storage medium as a function of data offset value 356 and the rotational speed of the storage medium (i.e., media speed 306). The calculated radial value is provided as an estimated radius 382.

Obtaining a reasonable estimate of the radial distance relies upon receiving data corresponding to the same track from two different read heads offset by an expected amount. A reasonable estimate of the radial distance may be obtained by using an expected down track separation between read heads (e.g., distance 198). In such a case, the time delay between the read heads may be calculated in accordance with the following equation:

$$\tau = \frac{(\text{Expected Distance}) * (\text{Period of Revolution of the Storage Medium})}{2\pi r},$$

where τ is the time delay between the read heads, and r is the radial distance of the track from the center point of the storage medium. By rearranging the aforementioned equation, estimated radius 382 (i.e., r) is calculated by radius calculation circuit 380 in accordance with the following equation:

$$r = \frac{(\text{Expected Distance}) * (\text{Period of Revolution of the Storage Medium})}{2\pi \tau},$$

Where increased accuracy is desired, a prior calculated actual down track distance that incorporates the skew angle due to the different stroke of the read/write head assembly may be used in place of the expected distance (e.g., distance 207 may be used in place of distance 198). Additionally, use of the prior calculated actual down track distance also allows for proper accounting of part-to-part variation in sensor geometry (i.e., relative read head location on a read/write head assembly) resulting during manufacture.

Where, on the other hand, comparison result 372 indicates that correlation value 362 is not less than correlation threshold 304, correlation controller circuit 350 provides different values for one of offset 352 or offset 354 and the process of correlation is repeated. The process of correlation is only repeated up until a maximum data offset value 356. Where comparison result 372 indicates that correlation value 362 is not less than correlation threshold 304 for any of the offset values up to the maximum data offset value, then it is assumed that the data received as first input 308 is not derived from the same track as the data received as second input 309. This condition is similar to that discussed above in relation to FIG. 2d.

Figure 4:
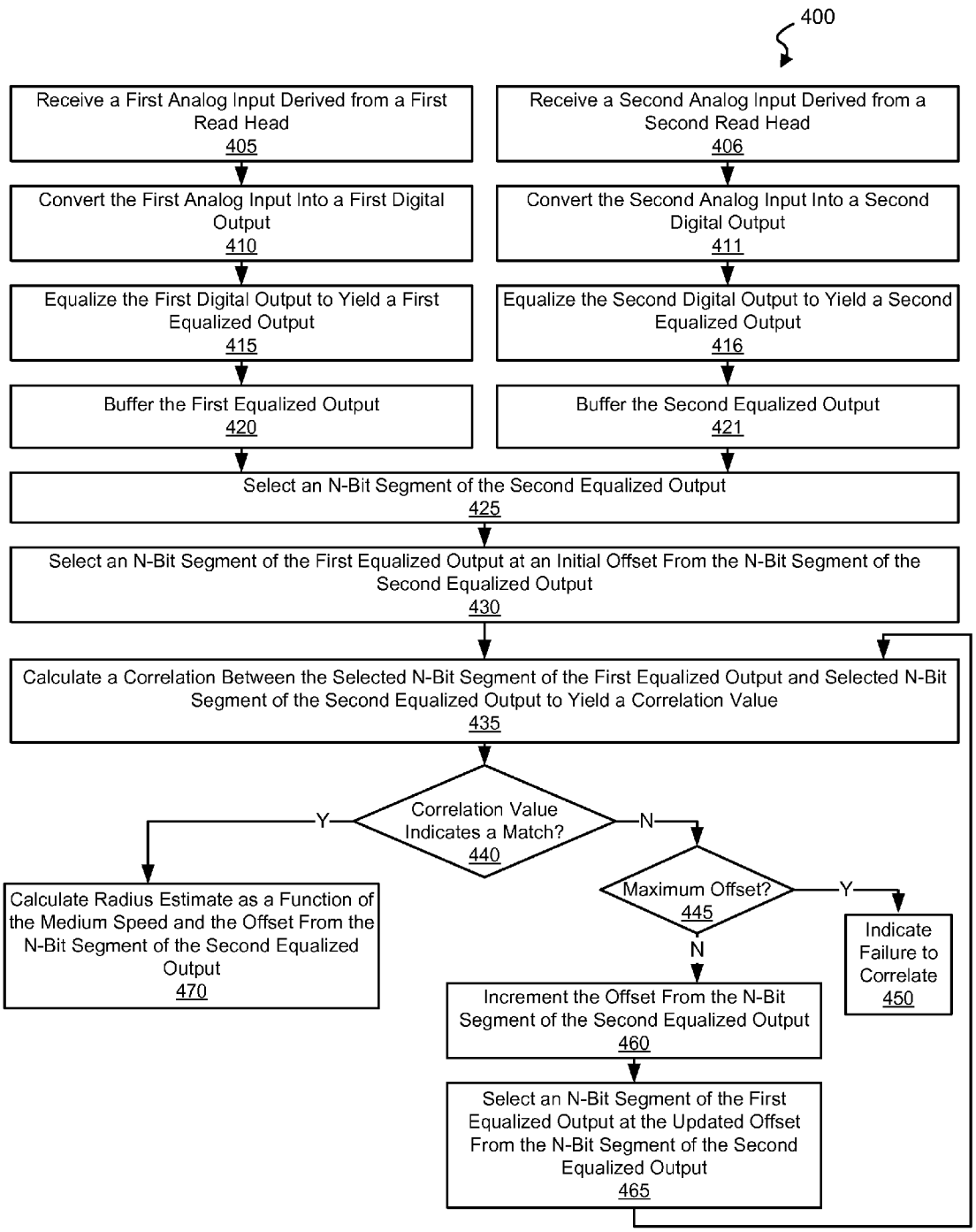
FIG. 4 is a flow diagram showing a method for estimating radial location in accordance with various embodiments of the present invention.

Turning to FIG. 4, a flow diagram 400 shows a method for estimating radial location in accordance with various embodiments of the present invention. Following flow diagram 400, a first analog input is derived from a first read head (block 405). The first read head is disposed over a track of a storage medium. The tracks are arranged radially over the surface of the storage medium, with each of the tracks being a radial distance from a center point of the storage medium. The first analog input is converted to a first digital output (block 410). The conversion may be done using a first analog to digital converter circuit. The first digital output is equalized to yield a first equalized output (block 415). In some cases, the equalization is done using an equalizer circuit. The first equalized output is then stored to a buffer (block 420). Similarly, a second analog input is derived from a second read head (block 406). The second read head is disposed over a track of a storage medium. In some cases, the second read head is disposed over the same track as the first read head. The second analog input is converted to a second digital output (block 411). The conversion may be done using a second analog to digital converter circuit. The second digital output is equalized to yield a second equalized output (block 416). The second equalized output is then stored to a buffer (block 421).

An n-bit segment of the second equalized output is selected (block 425). The n-bit segment may be any n bits from within the second equalized output. In some embodiments of the present invention, the value of n is eight. As an example, elements D4-D11 of data 123 of FIG. 1d may be selected as the n bits from the second equalized output. Based upon the disclosure provided herein, one of ordinary skill in the art will recognize other values for n that may be used in relation to different embodiments of the present invention. An n-bit segment of the first equalized output are selected at an initial offset from the n-bit segment of the second equalized output (block 430). As an example, the initial offset may be negative four in which case elements D0-D7 of data 125 of FIG. 1d are selected as the n-bit segment of the second equalized output. In some cases, the initial offset is selected to correspond to a maximum distance between two read heads in a read/write head assembly.

A correlation between the selected n-bit segment of the first equalized output (e.g., D4-D11 of data 123) and the selected n-bit segment of the second equalized output (e.g., D0-D7 of data 125) is calculated (block 435). The result of calculating the correlation is a correlation value. The correlation may be calculated in accordance with the following equation:

$$\text{Correlation Value} = \sum_{i=1}^{n} (\text{First Buffered Portion } [i] - \text{Second Buffered Portion } [i])^2.$$

Based upon the disclosure provided herein, one of ordinary skill in the art will recognize a variety of correlation algorithms that may be used in relation to different embodiments of the present invention, and/or different values for n that may be used in relation to different embodiments of the present invention.

The correlation value is compared with a correlation threshold to determined whether the two segments match (block 440). Where the two segments do not match (block 440), it is determined whether a maximum offset has been achieved (block 445). In some cases, the maximum offset is the negative of the initial offset and corresponds to the maximum distance between two read heads in the read/write head assembly in a direction opposite the initial offset. Where the maximum offset has been achieved (block 445), a failure to correlate is indicated (block 450). Such a failure to correlate may be the result of data being derived from different tracks as shown in FIG. 2d.

Alternatively, where the maximum offset has not been achieved (block 445), the offset from the n-bit segment of the second equalized output is incremented (block 460) and the n-bit segment of the first equalized output at the updated offset from the second equalized output is selected (block 465). Thus, for example, where the previous n-bit segment was D0-D7 of data 125, the newly selected n-bit segment will be D1-D8 of data 125. Using this newly selected segment of the first equalized output, the processes of blocks 435-440 are repeated.

Where, on the other hand, the correlation value indicates a match (block 440), an estimated radius is calculated as a function of the speed of the medium and the offset from the n-bit segment of the second equalized output (block 470).

A reasonable estimate of the radial distance may be calculated by using an expected down track separation between read heads (e.g., distance 198). In such a case, the time delay between the read heads may be calculated in accordance with the following equation:

$$\tau = \frac{(\text{Expected Distance}) * (\text{Period of Revolution of the Storage Medium})}{2\pi r},$$

where $\tau$ is the time delay between the read heads, and r is the radial distance of the track from the center point of the storage medium. By rearranging the aforementioned equation, the estimated radius may be calculated in accordance with the following equation:

$$r = \frac{(\text{Expected Distance}) * (\text{Period of Revolution of the Storage Medium})}{2\pi \tau},$$

Where increased accuracy is desired, a prior calculated actual down track distance that incorporates the skew angle due to the different stroke of the read/write head assembly may be used in place of the expected distance (e.g., distance 207 may be used in place of distance 198). Additionally, use of the prior calculated actual down track distance also allows for proper accounting of part-to-part variation in sensor geometry (i.e., relative read head location on a read/write head assembly) resulting during manufacture.

Figure 5A:
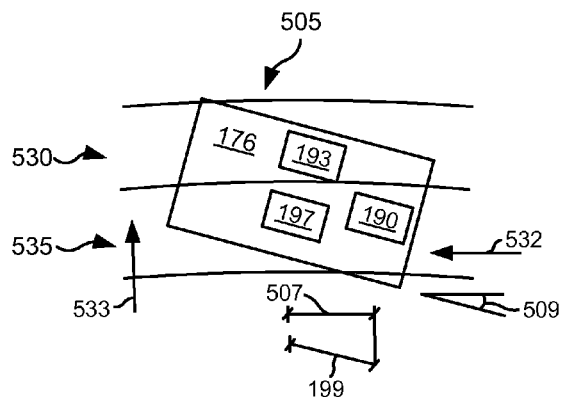
FIG. 5a-5c show example orientations of a read/write head assembly relative to tracks on a storage medium for different radial positions on the storage medium that may occur in relation to various embodiments of the present invention.
Figure 5B:
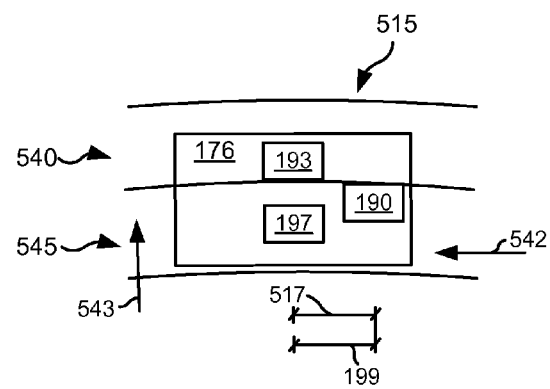
Figure 5C:
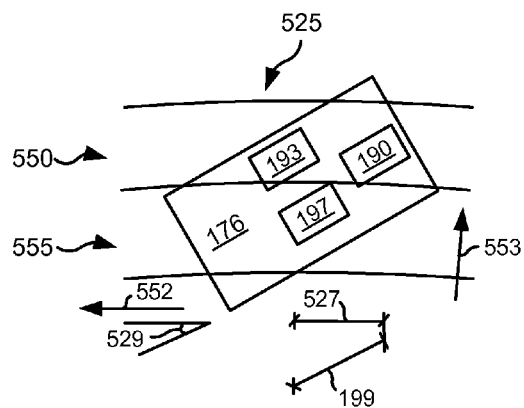

Turning to FIG. 5a-5c, example orientations 505, 515, 525 of a read/write head assembly 176 relative to tracks on a storage medium (e.g., disk platter 178) for different radial positions on the storage medium that may occur in relation to various embodiments of the present invention. Turning to FIG. 5a, example orientation 505 shows read/write head 176 traversing tracks 530, 535 near an outer diameter of disk platter 178 and in a down track direction 532. Of note, write head 191 is not included due to the disproportion of the distances between read heads 190, 193, 197 and write head 191. Track 535 is located a radial distance 533 from the center point of disk platter 178. The speed at which disk platter 178 is rotating varies depending upon the magnitude of radial distance 533. In the orientation shown, a down track distance 507 between read heads 193, 197 and read head 190 is a function of distance 199 and a skew angle 509. In particular, down track distance 507 is related to distance 199 by the following equation:

Distance 507=(Distance 199)cos(skew angle 509).

Distance 198 is the inline distance between read heads 193, 197 and read head 190. The aforementioned equation assumes cross-track separation is zero and skew is zero which provides a reasonable estimate of the distance. Where accuracy is to be enhanced, an enhanced equation using a non-zero cross-track separation may be used in relation to different embodiments of the present invention.

Turning to FIG. 5b, example orientation 515 shows read/write head 176 traversing tracks 540, 545 somewhere near a mid point between an outer diameter and an inner diameter of disk platter 178 in a down track direction 542. Track 545 is located a radial distance 543 from the center point of disk platter 178. The speed at which disk platter 178 is rotating varies depending upon the magnitude of radial distance 543. In the orientation shown, a down track distance 517 between read heads 193, 197 and read head 190 is the same as distance 199 as the skew angle is zero. Distance 199 is the inline distance between read heads 193, 197 and read head 190.

Turning to FIG. 5c, example orientation 525 shows read/write head 176 traversing tracks 550, 555 near an inner diameter of disk platter 178 and in a down track direction 552. Track 555 is located a radial distance 553 from the center point of disk platter 178. The speed at which disk platter 178 is rotating varies depending upon the magnitude of radial distance 553. In the orientation shown, a down track distance 527 between read heads 193, 197 and read head 190 is a function of distance 199 and a skew angle 529. In particular, down track distance 527 is related to distance 199 by the following equation:

Distance 527=(Distance 199)cos(skew angle 529).

Distance 199 is the inline distance between read heads 193, 197 and read head 190. The aforementioned equation assumes cross-track separation is zero and skew is zero which provides a reasonable estimate of the distance. Where accuracy is to be enhanced, an enhanced equation using a non-zero cross-track separation may be used in relation to different embodiments of the present invention.

Figure 6:
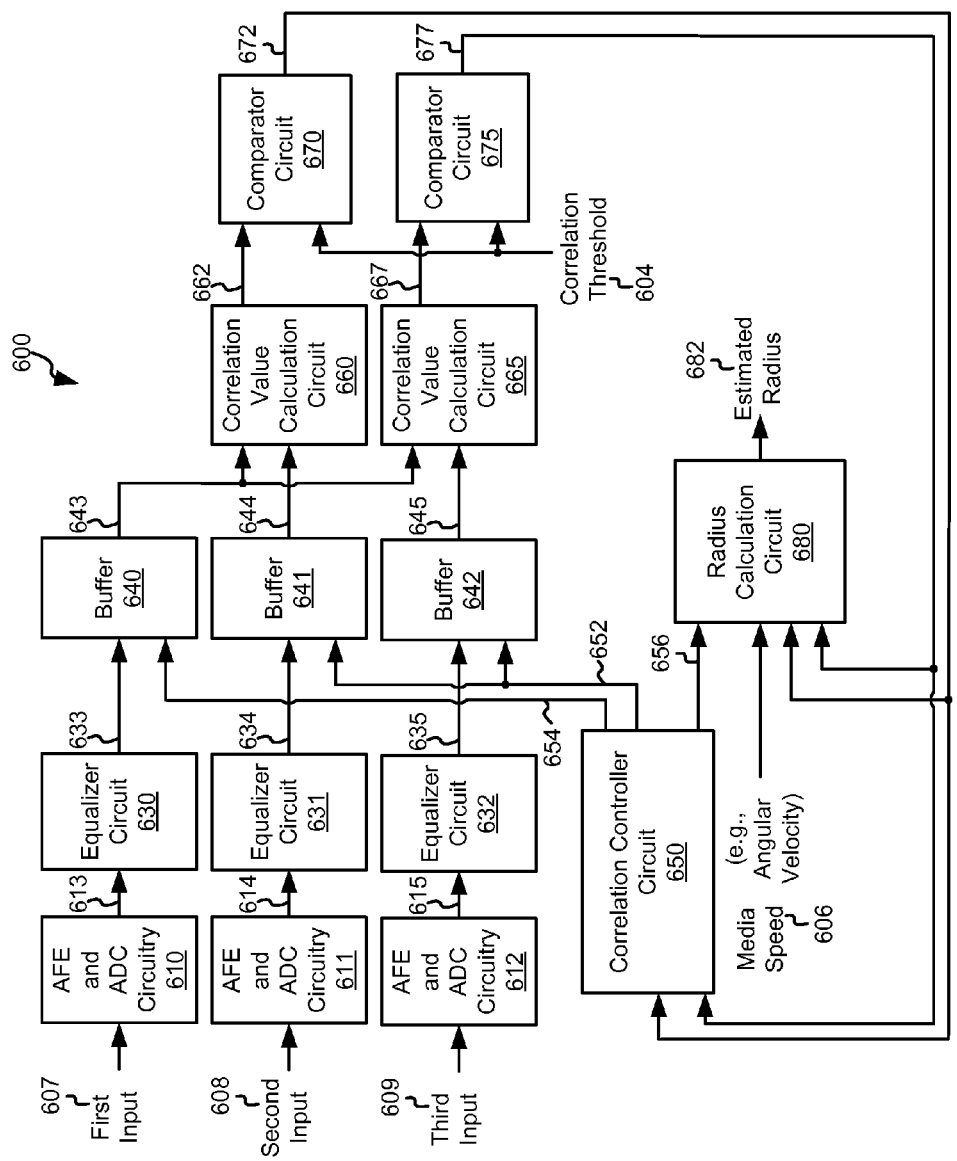
FIG. 6 is a block diagram of a radial distance estimation system in accordance with other embodiments of the present invention.

Turning to FIG. 6, a block diagram of a radial distance estimation system 600 is shown in accordance with some embodiments of the present invention. Radial distance estimation system 600 receives data from three read heads (e.g., a first read head corresponding to read head 190, a second read head corresponding to read head 193, and a third read head corresponding to read head 197). Radial distance estimation system 600 includes analog front end and analog to digital conversion circuitry 610 that receives a first input 607 (i.e., an input from a first read head) and provides corresponding digital samples 613. The analog front end circuitry processes first input 607 to yield a processed analog signal. The analog front end circuitry may include, but is not limited to, an analog filter and an amplifier circuit as are known in the art. Based upon the disclosure provided herein, one of ordinary skill in the art will recognize a variety of circuitry that may be included as part of the analog front end circuit.

The resulting processed analog signal is converted to digital samples 613 by the analog to digital converter circuitry. The analog to digital converter circuitry may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 613 are provided to an equalizer circuit 630 that applies an equalization algorithm to filtered output 622 to yield an equalized output 632. In some embodiments of the present invention, equalizer circuit 630 is a digital finite impulse response circuit as is known in the art. Equalized output 632 is stored to a buffer 640 where it is stored.

Similarly, radial distance estimation system 600 includes analog front end and analog to digital conversion circuitry 611 that receives a second input 608 (i.e., an input from a second read head) and provides corresponding digital samples 614. The analog front end circuitry processes second input 608 to yield a processed analog signal. The analog front end circuitry may include, but is not limited to, an analog filter and an amplifier circuit as are known in the art. Based upon the disclosure provided herein, one of ordinary skill in the art will recognize a variety of circuitry that may be included as part of the analog front end circuit.

The resulting processed analog signal is converted to digital samples 614 by the analog to digital converter circuitry. The analog to digital converter circuitry may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 614 are provided to an equalizer circuit 631 that applies an equalization algorithm to filtered output 624 to yield an equalized output 634. In some embodiments of the present invention, equalizer circuit 631 is a digital finite impulse response circuit as is known in the art. Equalized output 634 is stored to a buffer 641 where it is stored.

Similarly, radial distance estimation system 600 includes analog front end and analog to digital conversion circuitry 612 that receives a third input 609 (i.e., an input from a third read head) and provides corresponding digital samples 615. The analog front end circuitry processes third input 609 to yield a processed analog signal. The analog front end circuitry may include, but is not limited to, an analog filter and an amplifier circuit as are known in the art. Based upon the disclosure provided herein, one of ordinary skill in the art will recognize a variety of circuitry that may be included as part of the analog front end circuit.

The resulting processed analog signal is converted to digital samples 615 by the analog to digital converter circuitry. The analog to digital converter circuitry may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 615 are provided to an equalizer circuit 632 that applies an equalization algorithm to filtered output 625 to yield an equalized output 635. In some embodiments of the present invention, equalizer circuit 632 is a digital finite impulse response circuit as is known in the art. Equalized output 635 is stored to a buffer 642 where it is stored.

A correlation controller circuit 650 controls selection of a buffered portion 643 (i.e., a segment of data in buffer 640), a buffered portion 644 (i.e., a segment of data in buffer 641), and a buffered portion 645 (i.e., a segment of data in buffer 642) that are to be correlated. In particular, correlation controller circuit 650 asserts an offset 654 that is used to select buffered portion 643 from equalized output 633 stored to buffer 640, and correlation controller circuit 650 asserts an offset 652 that is used to select buffered portion 644 from equalized output 634 stored to buffer 641 and buffered portion 645 from equalized output 635 stored to buffer 642. Correlation controller circuit 650 provides a data offset value 656 to a radius calculation circuit 680. Data offset value 656 is a difference between offset 652 and offset 654. As an example, data offset value 656 corresponds to distance 187b of FIG. 1d when the portions derived from buffer 640, buffer 641 and buffer 642 are aligned.

Buffered portion 643 and buffered portion 644 are provided to a correlation value calculation circuit 660 that is operable to calculate a correlation value 662 indicative of the similarity between buffered portion 643 and buffered portion 644. In one particular embodiment of the present invention, correlation value calculation circuit 660 calculates correlation value 662 in accordance with the following equation:

$$\text{Correlation Value } 662 = \sum_{i=0}^{n} (\text{Buffered Portion } 643[i] - \text{Buffered Portion } 644[i])^2,$$

where n+1 is the number of elements included in the correlation calculation. In one particular embodiment of the present invention, n has a value of eight. Based upon the disclosure provided herein, one of ordinary skill in the art will recognize a variety of correlation algorithms that may be used in relation to different embodiments of the present invention, and/or different values for n that may be used in relation to different embodiments of the present invention.

Similarly, buffered portion 643 and buffered portion 645 are provided to a correlation value calculation circuit 665 that is operable to calculate a correlation value 667 indicative of the similarity between buffered portion 643 and buffered portion 645. In one particular embodiment of the present invention, correlation value calculation circuit 665 calculates correlation value 667 in accordance with the following equation:

$$\text{Correlation Value } 667 = \sum_{i=0}^{n} (\text{Buffered Portion } 643[i] - \text{Buffered Portion } 645[i])^2,$$

Again, based upon the disclosure provided herein, one of ordinary skill in the art will recognize a variety of correlation algorithms that may be used in relation to different embodiments of the present invention.

Correlation value 662 is provided to a comparator circuit 670 that compares it to a correlation threshold 604 to yield a comparison result 672. In some cases, correlation threshold 604 is user programmable. Similarly, correlation value 667 is provided to a comparator circuit 675 that compares it to correlation threshold 604 to yield a comparison result 677. Both comparison result 672 and comparison result 677 are provided to radius calculation circuit 680 and to correlation controller circuit 650. Where either comparison result 672 indicates that correlation value 662 is less than correlation threshold 604 or comparison result 677 indicates that correlation value 667 is less than correlation threshold 604, radius calculation circuit 680 calculates an estimated radial distance from an inner point of a storage medium as a function of data offset value 656 and the rotational speed of the storage medium (i.e., media speed 606). The calculated radial value is provided as an estimated radius 682.

Obtaining a reasonable estimate of the radial distance relies upon receiving data corresponding to the same track from two different read heads offset by an expected amount. A reasonable estimate of the radial distance may be obtained by using an expected down track separation between read heads (e.g., distance 199). In such a case, the time delay between the read heads may be calculated in accordance with the following equation:

$$\tau = \frac{(\text{Expected Distance}) * (\text{Period of Revolution of the Storage Medium})}{2\pi r},$$

where $\tau$ is the time delay between the read heads, and r is the radial distance of the track from the center point of the storage medium. By rearranging the aforementioned equation, estimated radius 682 (i.e., r) is calculated by radius calculation circuit 680 in accordance with the following equation:

$$r = \frac{(\text{Expected Distance}) * (\text{Period of Revolution of the Storage Medium})}{2\pi \tau},$$

Where increased accuracy is desired, a prior calculated actual down track distance that incorporates the skew angle due to the different stroke of the read/write head assembly may be used in place of the expected distance (e.g., distance 507 may be used in place of distance 199). Additionally, use of the prior calculated actual down track distance also allows for proper accounting of part-to-part variation in sensor geometry (i.e., relative read head location on a read/write head assembly) resulting during manufacture.

Where, on the other hand, comparison result 672 indicates that correlation value 662 is not less than correlation threshold 604 and comparison result 677 indicates that correlation value 667 is not less than correlation threshold 604, correlation controller circuit 650 provides different values for one of offset 652 or offset 654 and the process of correlation is repeated. The process of correlation is only repeated up until a maximum data offset value 656.

Figure 7:
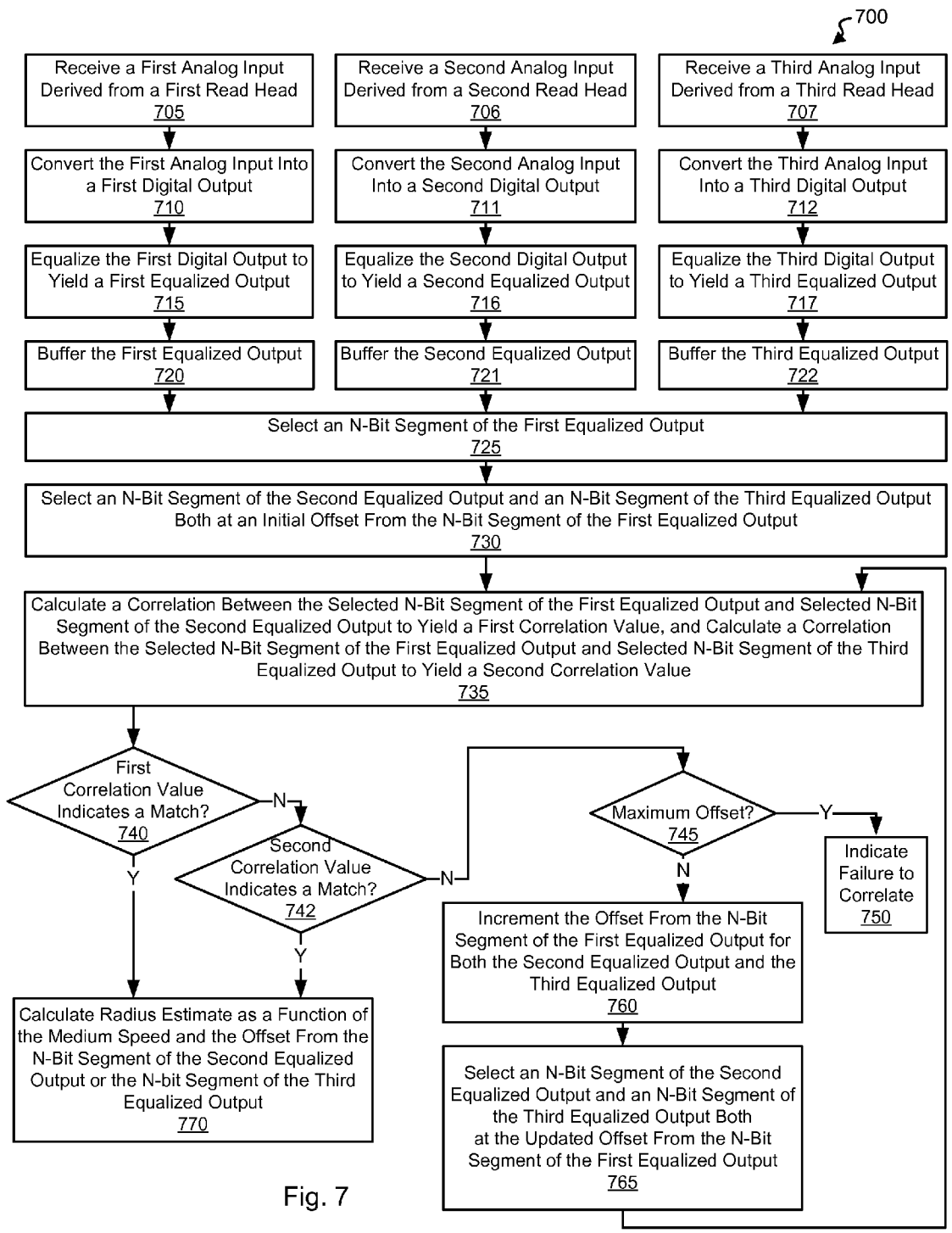
FIG. 7 is a flow diagram showing another method for estimating radial location in accordance with other embodiments of the present invention.

Turning to FIG. 7, a flow diagram 700 shows a method for estimating radial location in accordance with some embodiments of the present invention. Following flow diagram 700, a first analog input is derived from a first read head (block 705). The first read head is disposed over a track of a storage medium. The tracks are arranged radially over the surface of the storage medium, with each of the tracks being a radial distance from a center point of the storage medium. The first analog input is converted to a first digital output (block 710). The conversion may be done using a first analog to digital converter circuit. The first digital output is equalized to yield a first equalized output (block 715). In some cases, the equalization is done using an equalizer circuit. The first equalized output is then stored to a buffer (block 720). Similarly, a second analog input is derived from a second read head (block 706). The second read head is disposed over a track of a storage medium. In some cases, the second read head is disposed over the same track as the first read head. The second analog input is converted to a second digital output (block 711). The conversion may be done using a second analog to digital converter circuit. The second digital output is equalized to yield a second equalized output (block 716). The second equalized output is then stored to a buffer (block 721). Similarly, a third analog input is derived from a third read head (block 707). The third read head is disposed over a track of a storage medium. In some cases, the third read head is disposed over the same track as the first read head. The third analog input is converted to a third digital output (block 712). The conversion may be done using a third analog to digital converter circuit. The third digital output is equalized to yield a third equalized output (block 717). The third equalized output is then stored to a buffer (block 722).

An n-bit segment of the first equalized output is selected (block 725). The n-bit segment may be any n bits from within the first equalized output. In some embodiments of the present invention, the value of n is eight. As an example, elements D4-D11 of data 126 of FIG. 1e may be selected as the n bits from the first equalized output. Based upon the disclosure provided herein, one of ordinary skill in the art will recognize other values for n that may be used in relation to different embodiments of the present invention. An n-bit segment of the second equalized output and an n-bit segment of the third equalized output are selected at an initial offset from the n-bit segment of the first equalized output (block 730). As an example, the initial offset may be negative four in which case elements D0-D7 of data 124 of FIG. 1d are selected as the n-bit segment of the second equalized output, and elements X0-X7 of data 128 of FIG. 1d are selected as the n-bit segment of the third equalized output. In some cases, the initial offset is selected to correspond to a maximum distance between read heads 193, 197 and read head 190 in a read/write head assembly.

A correlation between the selected n-bit segment of the first equalized output (e.g., D4-D11 of data 126) and the selected n-bit segment of the second equalized output (e.g., D0-D7 of data 124) is calculated to yield a first correlation value, and a correlation between the selected n-bit segment of the first equalized output (e.g., D4-D11 of data 126) and the selected n-bit segment of the third equalized output (e.g., X0-X7 of data 128) is calculated to yield a second correlation value (block 735). The first and second correlation values may be calculated in accordance with the following equations:

First Correlation Value =

$$\sum_{i=1}^{n} (\text{First Buffered Portion } [i] - \text{Second Buffered Portion } [i])^2;$$

Second Correlation Value =

$$\sum_{i=1}^{n} (\text{First Buffered Portion } [i] - \text{Third Buffered Portion } [i])^2.$$

Based upon the disclosure provided herein, one of ordinary skill in the art will recognize a variety of correlation algorithms that may be used in relation to different embodiments of the present invention, and/or different values for n that may be used in relation to different embodiments of the present invention.

The first correlation value is compared with a correlation threshold to determined whether the two segments represented by the first correlation value match (block 740). Where the two segments do not match (block 740), the second correlation value is compared with the correlation threshold to determined whether the two segments represented by the second correlation value match (block 742). Where neither the first correlation value nor the second correlation value indicated a match (blocks 740, 742), it is determined whether a maximum offset has been achieved (block 745). In some cases, the maximum offset is the negative of the initial offset and corresponds to the maximum distance between read heads in the read/write head assembly in a direction opposite the initial offset. Where the maximum offset has been achieved (block 745), a failure to correlate is indicated (block 750).

Alternatively, where the maximum offset has not been achieved (block 745), the offset from the n-bit segment of the second equalized output and the third equalized output is incremented (block 760) and the n-bit segment of the second equalized output at the updated offset from the first equalized output is selected and the n-bit segment of the third equalized output at the updated offset from the first equalized output is selected (block 765). Thus, for example, where the previous n-bit segment of the second equalized output was D0-D7 of data 124, the newly selected n-bit segment will be D1-D8 of data 124; and where the previous n-bit segment of the third equalized output was X0-X7 of data 128, the newly selected n-bit segment will be D1-D8 of data 128. Using these newly selected segments of the second equalized output and the third equalized output, the processes of blocks 735-742 are repeated.

Where, on the other hand, the either of the first correlation value or the second correlation value indicates a match (blocks 740, 742), an estimated radius is calculated as a function of the speed of the medium and the offset from the n-bit segment of the first equalized output (block 770).

A reasonable estimate of the radial distance may be calculated by using an expected down track separation between read heads (e.g., distance 198). In such a case, the time delay between the read heads may be calculated in accordance with the following equation:

$$\tau = \frac{(\text{Expected Distance}) * (\text{Period of Revolution of the Storage Medium})}{2\pi r},$$

where τ is the time delay between the read heads, and r is the radial distance of the track from the center point of the storage medium. By rearranging the aforementioned equation, the estimated radius may be calculated in accordance with the following equation:

$$r = \frac{(\text{Expected Distance}) * (\text{Period of Revolution of the Storage Medium})}{2\pi \tau},$$

Where increased accuracy is desired, a prior calculated actual down track distance that incorporates the skew angle due to the different stroke of the read/write head assembly may be used in place of the expected distance (e.g., distance 207 may be used in place of distance 198). Additionally, use of the prior calculated actual down track distance also allows for proper accounting of part-to-part variation in sensor geometry (i.e., relative read head location on a read/write head assembly) resulting during manufacture.

Figure 8:
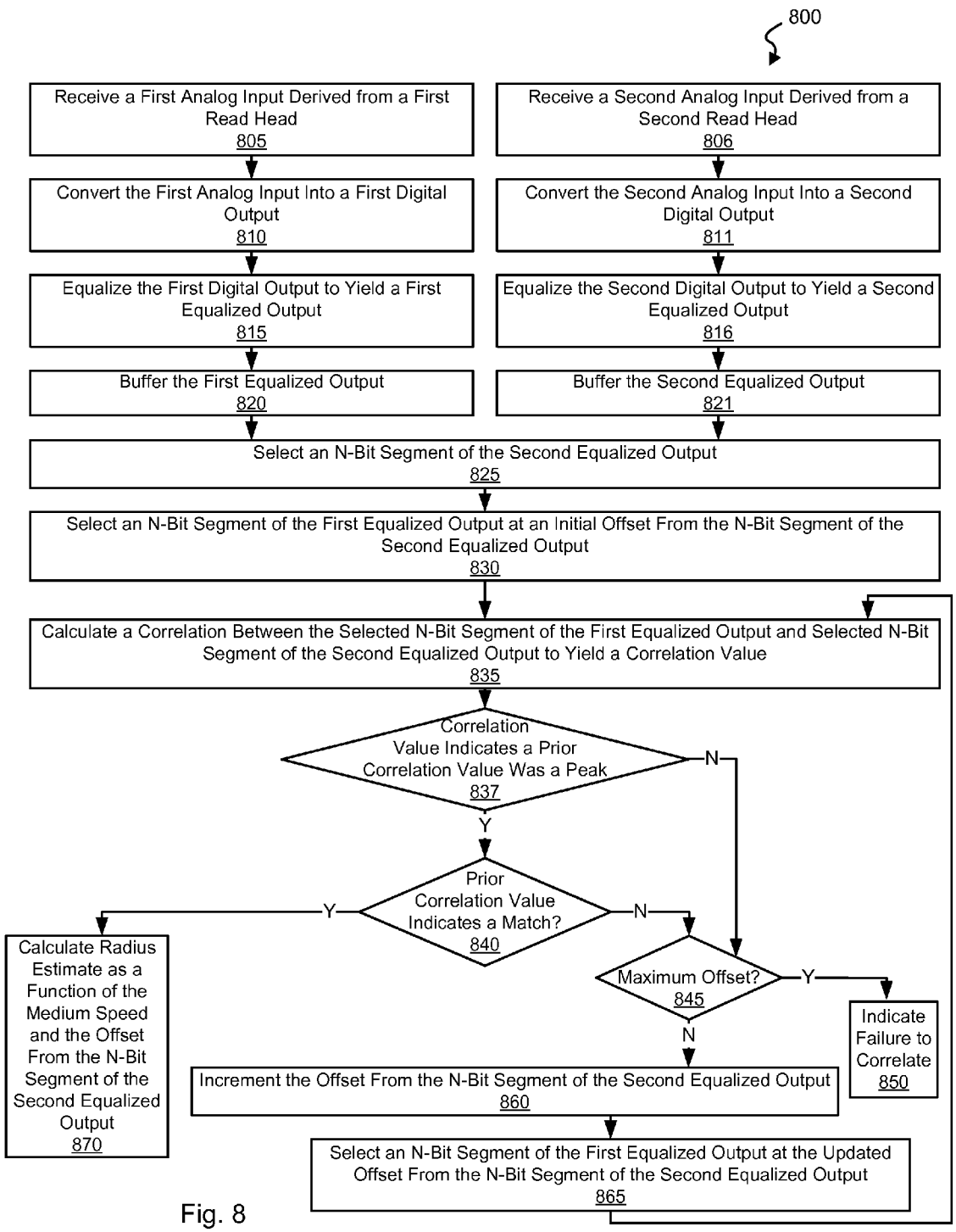
FIG. 8 is a flow diagram showing another method for estimating radial location using a peak correlation along with a correlation threshold in accordance with other embodiments of the present invention.

Turning to FIG. 8, a flow diagram 800 shows another method for estimating radial location using a peak correlation along with a correlation threshold in accordance with other embodiments of the present invention. Following flow diagram 800, a first analog input is derived from a first read head (block 805). The first read head is disposed over a track of a storage medium. The tracks are arranged radially over the surface of the storage medium, with each of the tracks being a radial distance from a center point of the storage medium. The first analog input is converted to a first digital output (block 810). The conversion may be done using a first analog to digital converter circuit. The first digital output is equalized to yield a first equalized output (block 815). In some cases, the equalization is done using an equalizer circuit. The first equalized output is then stored to a buffer (block 820). Similarly, a second analog input is derived from a second read head (block 806). The second read head is disposed over a track of a storage medium. In some cases, the second read head is disposed over the same track as the first read head. The second analog input is converted to a second digital output (block 811). The conversion may be done using a second analog to digital converter circuit. The second digital output is equalized to yield a second equalized output (block 816). The second equalized output is then stored to a buffer (block 821).

An n-bit segment of the second equalized output is selected (block 825). The n-bit segment may be any n bits from within the second equalized output. In some embodiments of the present invention, the value of n is eight. As an example, elements D4-D11 of data 123 of FIG. 1d may be selected as the n bits from the second equalized output. Based upon the disclosure provided herein, one of ordinary skill in the art will recognize other values for n that may be used in relation to different embodiments of the present invention. An n-bit segment of the first equalized output are selected at an initial offset from the n-bit segment of the second equalized output (block 830). As an example, the initial offset may be negative four in which case elements D0-D7 of data 125 of FIG. 1d are selected as the n-bit segment of the second equalized output. In some cases, the initial offset is selected to correspond to a maximum distance between two read heads in a read/write head assembly.

A correlation between the selected n-bit segment of the first equalized output (e.g., D4-D11 of data 123) and the selected n-bit segment of the second equalized output (e.g., D0-D7 of data 125) is calculated (block 835). The result of calculating the correlation is a correlation value. The correlation may be calculated in accordance with the following equation:

$$\text{Correlation Value} = \sum_{i=1}^{n} (\text{First Buffered Portion } [i] - \text{Second Buffered Portion } [i])^2.$$

Based upon the disclosure provided herein, one of ordinary skill in the art will recognize a variety of correlation algorithms that may be used in relation to different embodiments of the present invention, and/or different values for n that may be used in relation to different embodiments of the present invention.

It is determined whether the current correlation value is greater than the prior correlation value, and as such indicates that the prior correlation value was a peak (block 837). Such an approach relying on a single decline in the correlation value to indicate a peak may be replaced with a more sophisticated algorithm for determining a peak of a series of correlation values. In either case, it is determined which correlation value corresponds to a peak correlation between tested data sets, and the identified prior correlation value is used for additional processing. Based upon the disclosure provided herein, one of ordinary skill in the art will recognize a variety of approaches that may be used to identify a peak correlation value in accordance with different embodiments of the present invention.

Where the prior correlation value is not identified as a peak (block 837), it is determined whether a maximum offset has been achieved (block 845). In some cases, the maximum offset is the negative of the initial offset and corresponds to the maximum distance between two read heads in the read/write head assembly in a direction opposite the initial offset. Where the maximum offset has been achieved (block 845), a failure to correlate is indicated (block 850). Such a failure to correlate may be the result of data being derived from different tracks as shown in FIG. 2d. Alternatively, where the maximum offset has not been achieved (block 845), the offset from the n-bit segment of the second equalized output is incremented (block 860) and the n-bit segment of the first equalized output at the updated offset from the second equalized output is selected (block 865). Thus, for example, where the previous n-bit segment was D0-D7 of data 125, the newly selected n-bit segment will be D1-D8 of data 125. Using this newly selected segment of the first equalized output, the processes of blocks 835-440 are repeated.

Alternatively, where the prior correlation value is identified as a peak (block 837), the prior correlation value corresponding to the peak is compared with a correlation threshold to determined whether the two segments match (block 840). Where the two segments do not match (block 840), it is determined whether a maximum offset has been achieved (block 845) and the processes of blocks 850-865 are performed. Where, on the other hand, the correlation value indicates a match (block 840), an estimated radius is calculated as a function of the speed of the medium and the offset from the n-bit segment of the second equalized output (block 870).

A reasonable estimate of the radial distance may be calculated by using an expected down track separation between read heads (e.g., distance 198). In such a case, the time delay between the read heads may be calculated in accordance with the following equation:

$$\tau = \frac{(\text{Expected Distance}) * (\text{Period of Revolution of the Storage Medium})}{2\pi r},$$

where $\tau$ is the time delay between the read heads, and $r$ is the radial distance of the track from the center point of the storage medium. By rearranging the aforementioned equation, the estimated radius may be calculated in accordance with the following equation:

$$r = \frac{(\text{Expected Distance}) * (\text{Period of Revolution of the Storage Medium})}{2\pi \tau},$$

Where increased accuracy is desired, a prior calculated actual down track distance that incorporates the skew angle due to the different stroke of the read/write head assembly may be used in place of the expected distance (e.g., distance 207 may be used in place of distance 198). Additionally, use of the prior calculated actual down track distance also allows for proper accounting of part-to-part variation in sensor geometry (i.e., relative read head location on a read/write head assembly) resulting during manufacture.

It should be noted that the embodiments disclosed herein relate to a two read head and a three read head system each in particular configurations, but that other embodiments of the present invention may apply to four or more heads, and/or may apply to different head configurations. As an example, some embodiments of the present invention may be applied to a read/write head assembly having three read heads stacked in a down-track direction, where two measurements could be made for improved accuracy by using the 1st and 2nd readers as one pair and the 2nd and 3rd readers as another pair. As another example, other embodiments of the present invention may be applied to a read/write head assembly having two read heads separated in the cross-track direction and with zero down-track separation at zero skew. As yet another example, other embodiments of the present invention may be applied to a read/write head assembly having multiple read heads in any combination of side-by-side and stacked configurations where each stack may be offset from layers below it. Based upon the disclosure provided herein, one of ordinary skill in the art will recognize a variety of configurations of the read heads in the read/write head assembly.

It should be noted that while the described embodiments discuss calculating an estimated radial location based upon a single delay value derived from correlating two different data streams, other embodiments of the present invention may calculate an estimated radial location based upon multiple delay values such as those identified above in relation to FIGS. 1f and 1g. Using FIG. 1e for example, delay 1186a may be used to calculate a first estimated radius and delay 1186b may be used to calculate a second estimated radius. The first and second estimated radii may then be, for example, averaged to yield an overall estimated radius. Alternatively, one or the other of the first estimated radius or the second estimated radius may be selected as the overall estimated radius. The selection may be based, for example, upon which data set gave the highest quality peak correlation value (i.e., the steepest difference between the peak correlation value and the preceding and succeeding correlation values). Alternatively, a weighting of the first estimated radius and the second estimated radius based upon which data set gave the highest quality peak correlation value may be performed to yield the overall estimated radius. The same process may be extended to use the three delays 1286, 1287, 1288 of FIG. 1g to combine three estimated radii to yield an overall estimated radius.

It should be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for out of order data processing. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data processing system, the data processing system comprising:
    a first data input processing circuit operable to receive a first data set from a first read head and to store the first data set to a first buffer;
    a second data input processing circuit operable to receive a second data set from a second read head and to store the second data set to a second buffer, wherein the second data set is offset from the first data set;
    a correlation processing circuit operable to:
        correlate a portion of the first data set with a portion of the second data set to yield a correlation value; and
        determine the offset between the first data set and the second data set at a delay where the correlation value indicates a match between the portion of the first data set and the portion of the second data set; and
    a radius calculation circuit operable to calculate an estimated radial location of a track on a storage medium from which the first data set and the second data set are derived.

2. The data processing system of claim 1, wherein the portion of the second data set is a first portion of the second data set, and wherein the correlation processing circuit is further operable to:
    select the first portion of the second data set based upon a first index;
    determine that the first portion of the second data set does not match the portion of the first data set;
    select a second portion of the second data set based upon a second index;
    determine that the second portion of the second data set matches the portion of the first data set; and
    wherein the offset is generated based at least in part on the second index.

3. The data processing system of claim 1, wherein the data processing system is implemented as part of a data storage device, and wherein the data storage device includes the storage medium.

4. The data processing system of claim 3, wherein calculating the estimated radial location of the track on the storage medium is further based upon a rotational rate of the storage medium.

5. The data processing system of claim 4, wherein the radial location of the track on the storage medium is calculated in accordance with the following equation:

$$\frac{(\text{Expected Distance}) * (\text{Period of Revolution of the Storage Medium})}{2\pi\tau},$$

wherein the expected distance is a distance between the first read head and the second read head, wherein the period of revolution of the storage medium is calculated based upon the rotational rate of the storage medium, and wherein $\tau$ is the offset in units of time.

6. The data processing system of claim 1, wherein the offset is a first offset, wherein the correlation value is a first correlation value, and wherein the system further comprises:
    a third data input processing circuit operable to receive a third data set from a third read head and to store the third data set to a third buffer; and wherein the correlation processing circuit is further operable to:
  correlate a portion of the first data set with a portion of the third data set to yield a second correlation value; and
  determine a second offset between the first data set and the third data set at a delay where the second correlation value indicates a match between the portion of the first data set and the portion of the third data set; and
wherein the radius calculation circuit is further operable to calculate the estimated radial location of the track on the storage medium from which at least two of the first data set, the second data set and the third data set are derived based at least in part on one of the first offset or the second offset.

7. The data processing system of claim 6, wherein the data processing system is implemented as part of a data storage device, and wherein the data storage device includes the storage medium.

8. The data processing system of claim 7, wherein the first correlation value does not indicate a match between the portion of the first data set and the portion of the second data set, wherein the second correlation value does indicate a match between the portion of the first data set and the portion of the third data set, and wherein calculating the estimated radial location of the track on the storage based on the second offset and a rotational rate of the storage medium.

9. The data processing system of claim 1, wherein the system is implemented as part of an integrated circuit.

10. The data processing system of claim 1, wherein the system further comprises:
  a read/write head assembly incorporating the first read head and the second read head.

11. The data processing system of claim 10, wherein the read/write head assembly includes the first read head offset from the second read head in a down-track direction.

12. The data processing system of claim 10, wherein the read/write head assembly includes the first read head offset from the second read head in both a down-track direction and a cross-track direction.

13. The data processing system of claim 1, wherein the first data input processing circuit includes at least one of: an analog filter circuit, an analog amplifier circuit, an analog to digital converter circuit, and an equalizer circuit.

14. A method for radial distance estimation, the methods comprising:
  providing a storage medium operable to store data along a track located at radial offsets from a center point of the storage medium;
  receiving a first data input derived from a first read head disposed over the track;
  storing the first data set to a first buffer;
  receiving a second data input derived from a second read head disposed over the track;
  storing the second data set to a second buffer;
  correlating a portion of the first data set with a portion of the second data set to yield a correlation value; and
  determining the offset between the first data set and the second data set at a delay where the correlation value indicates a match between the portion of the first data set and the portion of the second data set; and
  calculating an estimated radial location of the track.

15. The method of claim 14, wherein the portion of the second data set is a first portion of the second data set, and wherein the method further comprises:
  selecting the first portion of the second data set based upon a first index;
  determining that the first portion of the second data set does not match the portion of the first data set;
  selecting a second portion of the second data set based upon a second index;
  determining that the second portion of the second data set matches the portion of the first data set; and
  wherein the offset is generated based at least in part on the second index.

16. The method of claim 14, wherein calculating the estimated radial location of the track on the storage medium is further based upon a rotational rate of the storage medium.

17. The method of claim 16, wherein the radial location of the track on the storage medium is calculated in accordance with the following equation:

$$\frac{(\text{Expected Distance}) * (\text{Period of Revolution of the Storage Medium})}{2\pi\tau},$$

wherein the expected distance is a distance between the first read head and the second read head, wherein the period of revolution of the storage medium is calculated based upon the rotational rate of the storage medium, and wherein $\tau$ is the offset in units of time.

18. The method of claim 14, wherein the offset is a first offset, wherein the correlation value is a first correlation value, and wherein the method further comprises:
  receiving a third data input derived from a third read head disposed over another the track;
  storing the third data set to a third buffer;
  correlating a portion of the first data set with a portion of the third data set to yield a second correlation value.

19. The method of claim 18, wherein the second correlation value does not indicate a match between the portion of the first data set and the portion of the third data set, wherein the first correlation value does indicate a match between the portion of the first data set and the portion of the second data set, and wherein calculating the estimated radial location of the track on the storage based on the first offset and a rotational rate of the storage medium.

20. A data processing system, the data processing system comprising:
  a first data input processing circuit operable to receive a first data set from a first read head and to store the first data set to a first buffer;
  a second data input processing circuit operable to receive a second data set from a second read head and to store the second data set to a second buffer;
  a third data input processing circuit operable to receive a third data set from a third read head and to store the third data set to a third buffer;
  a correlation processing circuit operable to:
    correlate a portion of the first data set with a portion of the second data set to yield a first correlation value;
    correlate a portion of the first data set with a portion of the third data set to yield a second correlation value;
    select one of the first correlation value or the second correlation value as a selected correlation value;
    determine the offset between the first data set and the second data set at a delay where the selected correlation value indicates a match.

* * * * *